No. 792,454. Patented June 13, 1905.

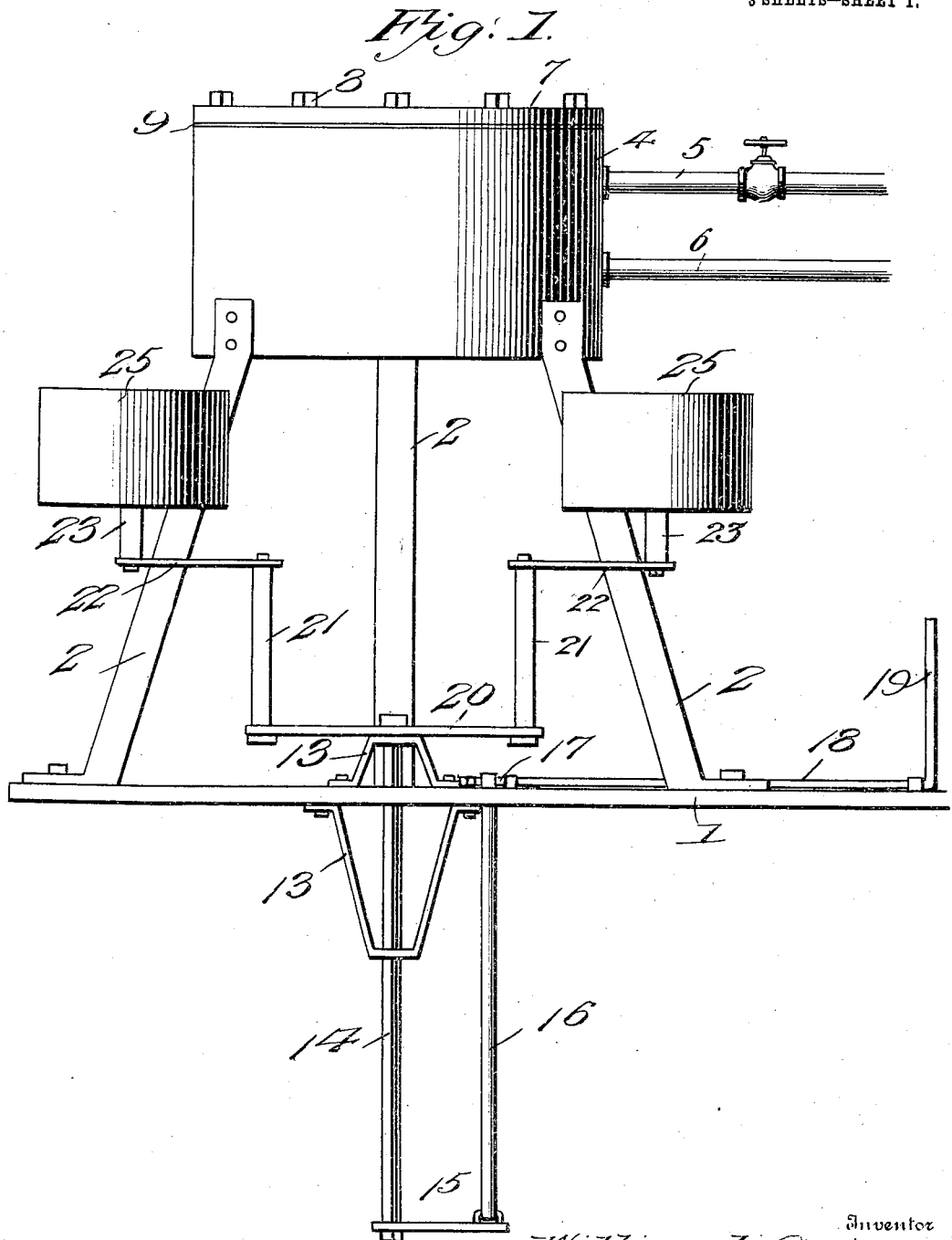

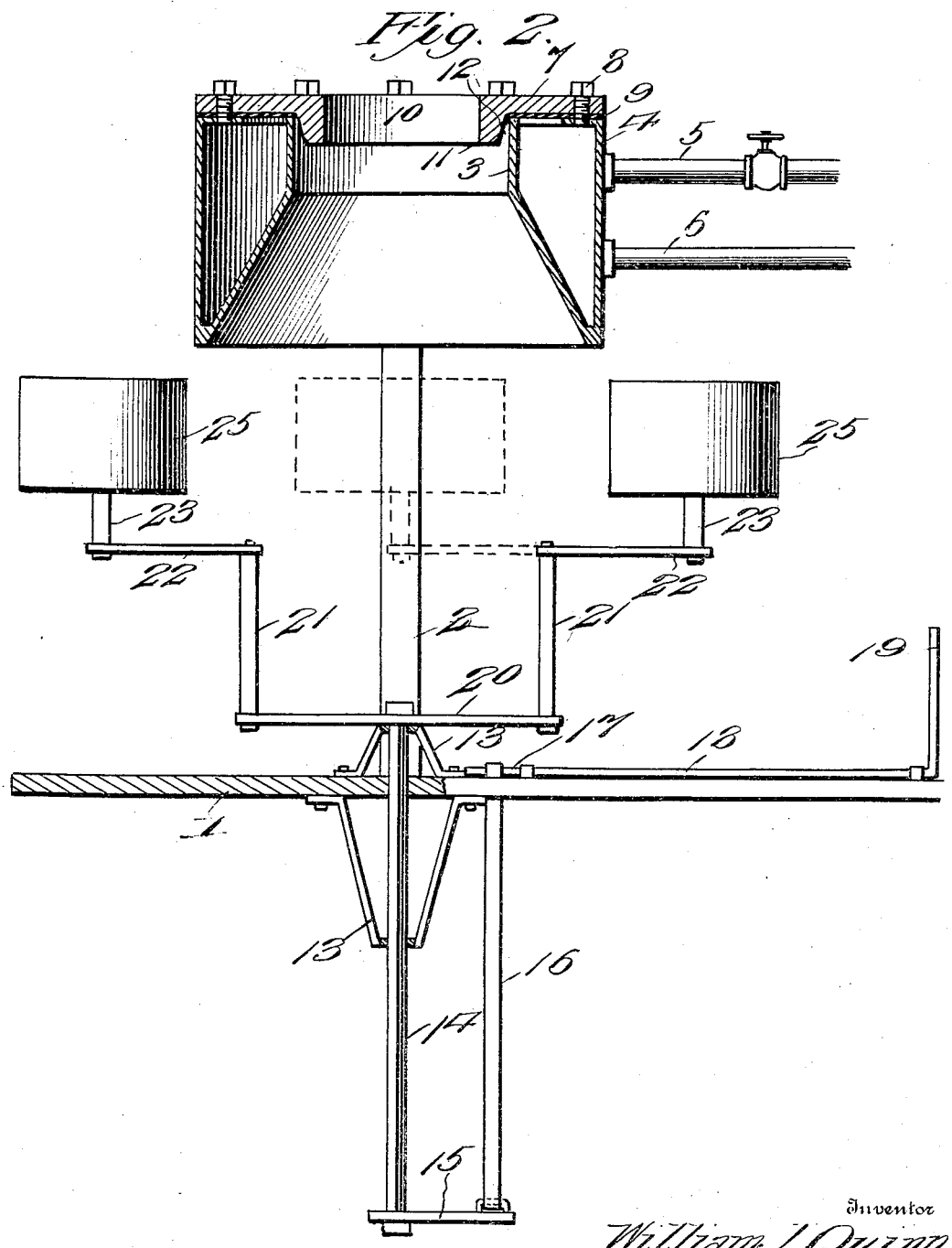

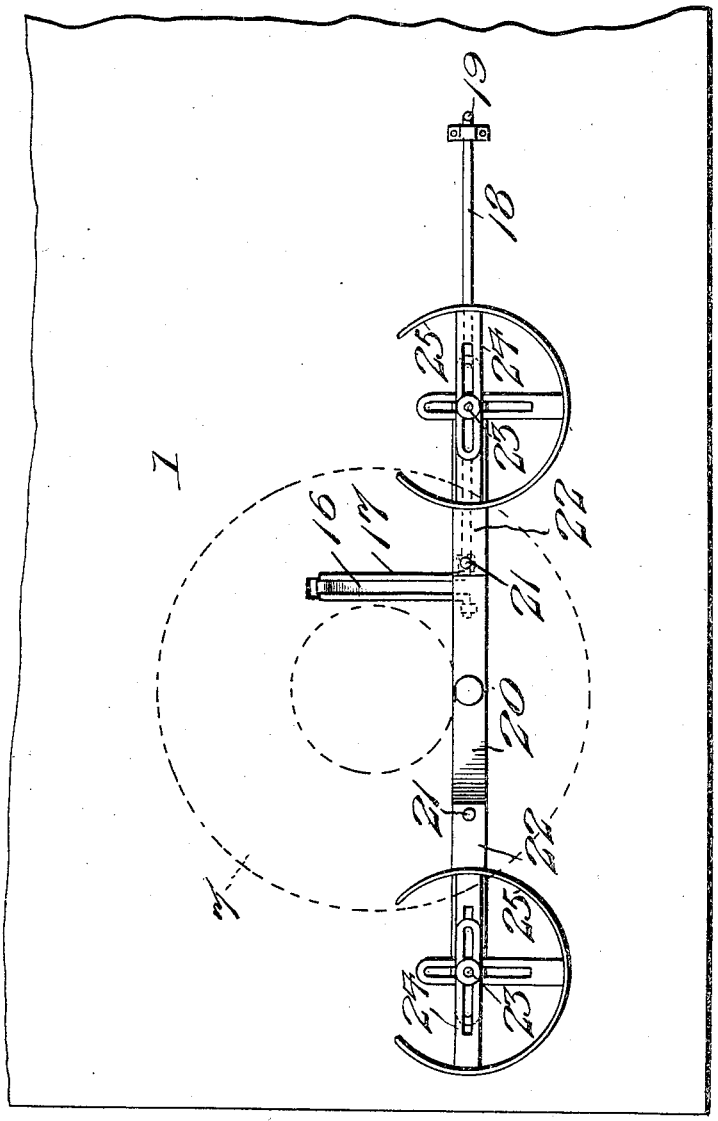

UNITED STATES PATENT OFFICE.

WILLIAM J. QUINN, OF GOSHEN, INDIANA.

COLLAR-IRONING MACHINE.

SPECIFICATION forming part of Letters Patent No. 792,454, dated June 13, 1905.

Application filed February 6, 1904. Serial No. 192,389

*To all whom it may concern:*

Be it known that I, WILLIAM J. QUINN, a citizen of the United States, residing at Goshen, in the county of Elkhart and State of Indiana, have invented new and useful Improvements in Collar-Ironing Machines, of which the following is a specification.

My invention relates to new and useful improvements in means for shaping and drying "lay-down" or "turn-over" collars; and its object is to provide a device of this character which will separate the band of the collar from the outer portion thereof, so as to permit a necktie to be readily placed between them, and to provide means whereby all the rough and irregular edges may be removed from the collar.

With the above and other objects in view the invention consists of the novel construction and combination of parts hereinafter more fully described and claimed, and illustrated in the accompanying drawings, showing the preferred form of my invention, and in which—

Figure 1 is a front elevation of the device. Fig. 2 is a central vertical section therethrough. Fig. 3 is a plan view of the collar-holding devices, the shaping device being shown in dotted lines.

Referring to the figures by numerals of reference, 1 is a platform on which are arranged standards 2, which serve to support a shaping device 3, which is preferably funnel-shaped, as shown in Fig. 2, with the large end thereof at the bottom. This shaping device is inclosed by a jacket 4, having an inlet 5 and an outlet 6, whereby a continuous supply of steam may be admitted thereto, so as to keep the shaping device warm. Arranged upon the jacket and shaping device is a cap 7, which is secured in place in any suitable manner, preferably by means of bolts 8, and has packing 9 interposed between it and the jacket. This cap has an aperture 10 at the center thereof, which is surrounded by a downwardly-extending flange 11, and the flange is spaced from the inner wall of the shaping device 3 to produce a groove 12.

Guide-brackets 13 are secured to platform 1, and slidably mounted therein is a stem 14, having an arm 15 at its lower end, which is connected by a strap 16 with a crank 17 on an operating-shaft 18. A lever 19 is formed at one end of the shaft, so as to permit the same to be readily rotated. A cross-strip 20 is secured to the upper end of stem 14 and has standards 21 at the ends thereof, to the upper end of each of which is pivoted an arm 22, having an upright 23 thereon. Each upright projects through inwardly-extending longitudinally-slotted plates 24, which are fastened to the lower edge of a curved plate 25. These plates are slightly less in diameter than the lower end of the shaping device 3 and are adapted to be contracted, such movement being permitted in view of the fact that the plates 24 are slidably mounted upon the uprights 23.

After a collar has been properly ironed the seam along which it is to be folded is moistened. The collar is then placed on one of the curved plates 25 with the band inside and the body portion outside of the plate. Said plate is then swung into position under the shaping device 3 by swinging arm 22 on its pivot. Shaft 18 is then revolved by means of lever 19, and stem 14 is drawn upward by the crank 17 and strap 16, and the curved plate 25 is forced into the frusto-conical portion of the shaping device and is contracted thereby. The plate is then moved farther upward and into the groove 12, where the seam of the collar is smoothed. During this operation the seam, as well as all other portions of the collar, is thoroughly heated by the steam within the jacket 4 and all rough and uneven places in the seam are removed. While one collar is held in place within the shaping device another can be placed on the other plate 25 and will be ready to be placed within the shaping device when the other is removed therefrom.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a machine of the character described, the combination with a shaping device having heating means therearound; of a contractible curved plate adjustably mounted adjacent said shaping device, and means for projecting said plate into the shaping device.

2. In a machine of the character described, the combination with a shaping device, and a jacket inclosing the same and having an inlet and an outlet; of contractible curved plates adjustably mounted adjacent the shaping device, and means for projecting the same into the shaping device.

3. In a machine of the character described, the combination with a shaping device having a jacket inclosing the same and provided with an inlet and an outlet, a cap upon the jacket, and a circular flange thereon projecting into the shaping device to form a groove; of a curved contractible plate adjustably mounted adjacent the shaping device, and means for projecting the same thereinto and into the groove.

4. In a machine of the character described, the combination with a shaping device having a frusto-conical inlet, and a jacket inclosing said device and having an inlet and an outlet, of a cap secured upon the shaping device and jacket and having a circular flange depending into the shaping device and forming a curved groove, a stem slidably mounted below the shaping device, means for reciprocating the same, a collar-holding device connected to the stem and adapted to be shifted into position below the inlet of the shaping device.

5. The combination with a shaping device having a jacket inclosing the same, and a cap secured to the jacket and having a circular flange projecting into the shaping device and forming a curved groove; of a stem slidably mounted below the shaping device, curved contractible plates connected thereto and adapted to be shifted into position below the shaping device, and means for operating the stem.

6. The combination with a shaping device having a jacket inclosing the same and having an inlet and an outlet for heating means; of a cap detachably secured upon the jacket a flange depending from the cap and projecting into the shaping device, a stem slidably mounted in alinement with the center of the shaping device, curved contractible plates movable with the stem and adapted to be shifted into position below the shaping device, and means for operating the stem and plates.

7. The combination with standards having a shaping device thereon provided with a frusto-conical inlet, and a jacket inclosing the shaping device and having an inlet and an outlet for heating means; of a cap detachably secured upon the jacket, a circular flange depending therefrom and projecting into the shaping device to produce a curved groove, a stem slidably mounted in alinement with the center of the shaping device, an arm extending therefrom, a crank-shaft, means connecting the crank-shaft and arm for reciprocating the stem, and contractible curved collar-supporting plates movable with the stem and adapted to be adjusted into position below the shaping device.

8. In a machine of the class described, a shaping device, means for heating the same, a contractible collar-supporting member sustained adjacent said shaping device, and means for projecting the member into the device.

9. In a machine of the class described, a frusto-conical shaping device having a surrounding jacket, means for introducing a heating medium into said jacket, and a contractible collar-supporting member sustained adjacent to and adapted for entrance into the shaping device.

In testimony whereof I affix my signature in presence of two witnesses.

WILLIAM J. QUINN.

Witnesses:
 ADA R. HUFFMAN,
 PEARL JUDAY.